United States Patent

MacKnight

[15] 3,693,174

[45] Sept. 19, 1972

[54] ASSOCIATIVE MEMORY DEVICE AND SYSTEM

[72] Inventor: Merritt L. MacKnight, Los Angeles, Calif.

[73] Assignee: Litton Systems, Inc., Beverly Hills, Calif.

[22] Filed: July 6, 1971

[21] Appl. No.: 159,867

[52] U.S. Cl. ..340/173 AM, 340/173 R, 340/173 FF, 307/238

[51] Int. Cl. ..........................................G11c 11/40

[58] Field of Search ......340/173 R, 173 AM, 173 FF

[56] References Cited

UNITED STATES PATENTS 3,633,182 1/1972 Koo....................340/173 AM

*Primary Examiner*—Terrell W. Fears
*Attorney*—Alan C. Rose et al.

[57] ABSTRACT

An associative memory is disclosed which includes a memory cell having first and second semiconductor memory devices each having electrically controllable first and second threshold voltage levels and each having an input electrode, an output electrode and a control electrode. The threshold voltage of the semiconductor memory devices are set to complementary ones of the threshold voltage levels indicative of the state of the binary bit to be stored in that particular memory cell. Complementary signals are applied to the input electrodes of the semiconductor memory devices indicative of the state of the applied binary bit to be compared to the bit stored in the memory cell. The output electrodes of the two semiconductor memory devices in the cell are connected to an output node. An interrogation signal is applied to the control electrodes of the semiconductor memory devices, and an output signal is obtained from the output node indicative of the correlation of the stored bit and the applied bit at the time of the application of the interrogation signal.

24 Claims, 2 Drawing Figures

MERRITT L. MAC KNIGHT

INVENTOR

BY Ronald W Reagin

ATTORNEY

ASSOCIATIVE MEMORY DEVICE AND SYSTEM

This invention relates to electronic memories and more particularly to an improved memory cell and array of such memory cells for use in an associative memory.

There are many applications in the computer art which require the identification of a sequence of binary digits or bits. The sequence to be identified may appear either serially, with or without commas or other word-markers, or it may appear in parallel as a multi-bit binary number. An associative memory is a device which receives such signals, compares the signal as received with one or more binary words stored in the associative memory and provides output signals indicative of the correlation of the applied binary signal with the binary words stored in the associative memory. Such memories usually provide a separate output signal for each word stored in the memory, with the output signal coming from each respective word having a state dependent upon whether or not the applied binary signal was the same as the word stored in that particular portion of the memory.

The recognition is usually provided by a bit-by-bit matching of the incoming binary signal with the bits of the stored binary words. The incoming binary signal to be recognized may frequently consist of as many as several hundred binary bits or more, and the number of recognition possibilities, which is to say the number of stored words to which the applied signal must be compared, may also be in the hundreds. Accordingly, such associative memory devices frequently require the storage of a large number of binary bits.

There are a number of characteristics which such associative memory devices should have. For example, it is frequently desirable to write a new word into the memory against which the incoming data is to be compared. Sometimes the new word to be written into the memory is itself obtained from the incoming data for subsequent use in recognizing a later occurrance of the same signal. Thus, the memory should provide means for easily changing the words which are stored in the memory for comparison and should provide means for writing a portion of an applied signal itself into the memory for subsequent comparison to later occurrances of the same sequence of bits.

In addition, long term storage of the words to be recognized is required in many applications. In such applications, it would be extremely desirable that the storage aspects of the memory be both non-volatile (that is, the information is retained in the memory even if the power is removed from the memory) and non-destructive on read-out.

Most non-volatile, non-destructive read-out memories in the prior art have either stored the information magnetically in magnetic cores, magnetic tape, magnetic drums or the like or have stored the information in such forms as punched cards, punched paper tape or the like. However, other physical characteristics of this type of memory are undesirable for many computer applications, such as airborne applications, where high reliability, small size and low power are severe requirements in the system. Requirements of this type generally negate using equipment with moving parts, such punch-card readers and punch paper tape readers, and also render heavy, bulky and high-power consuming memories, such as the various magnetic memories, quite undesirable. This type of application usually requires some type of electronic memory.

Another requirement of memories of this type is that the system frequently requires recognition of a real-time flow of data where the several sequences of digits to be recognized are embedded in a larger set of continuous and unending series of digits which are generated as a part of the real-time process. In these applications, a high-speed search of the comparison words which are stored in the memory bank is demanded.

It is accordingly an object of the present invention to provide an improved associative memory.

It is another object of the present invention to provide an improved memory cell and an array of such cells which may be used as an associative memory.

It is yet another object of the present invention to provide an improved associative memory which is both non-volatile and non-destructive on readout.

It is still another object of the present invention to provide an improved associative memory in which large quantities of information can be stored and compared, but which is physically quite small and requires very little electrical power.

It is still another object of the present invention to provide an improved associative memory which can easily be formed by conventional integrated circuit techniques.

Briefly stated, and in accordance with the presently preferred embodiment of the invention, an associative memory is provided which includes a memory cell having first and second semiconductor memory devices each having electrically controllable first and second threshold voltage levels and each having an input electrode, an output electrode and a control electrode. For example, such a semiconductor memory device could be a metal-nitride-oxide-silicon (MNOS) insulated gate field-effect transistor. Means are provided for setting the threshold voltage of the semiconductor memory devices to complementary ones of the threshold voltage levels indicative of the state of the binary bit to be stored in that particular memory cell and input means are provided for applying complementary signals to the input electrodes of the semiconductor memory devices indicative of the state of the applied binary bit to be compared to the bit stored in the memory cell. The output electrodes of the two semiconductor memory devices in the cell are connected to an output node, and means are provided for applying an interrogation signal to the control electrodes of the semiconductor memory devices. An output signal is then obtained from the output node indicative of the correlation of the stored bit and the applied bit at the time of the application of the interrogation signal. An associative memory system for comparing an applied signal of N bits length to M stored words each of N bits length is formed from an N by M array of such memory cells in which the input electrodes of all the memory cells in a given column are connected in parallel to receive a signal indicative of the state of the applied bit and the output means of all of the memory cells in a given row are connected together in series to indicate whether or not the applied word is the same as the words stored in that particular row.

For a complete understanding of the invention, together with an appreciation of other objects and advantages thereof, please refer to the following detailed description of the attached drawings, in which:

FIG. 1 shows an associative memory system 10 which receives an applied binary signal of N bits length, compares this applied signal to M words, each of N bits length, and provides output signals indicative of the correlation of the applied binary signal to each of the M binary words stored in memory 10.

Figure 1:
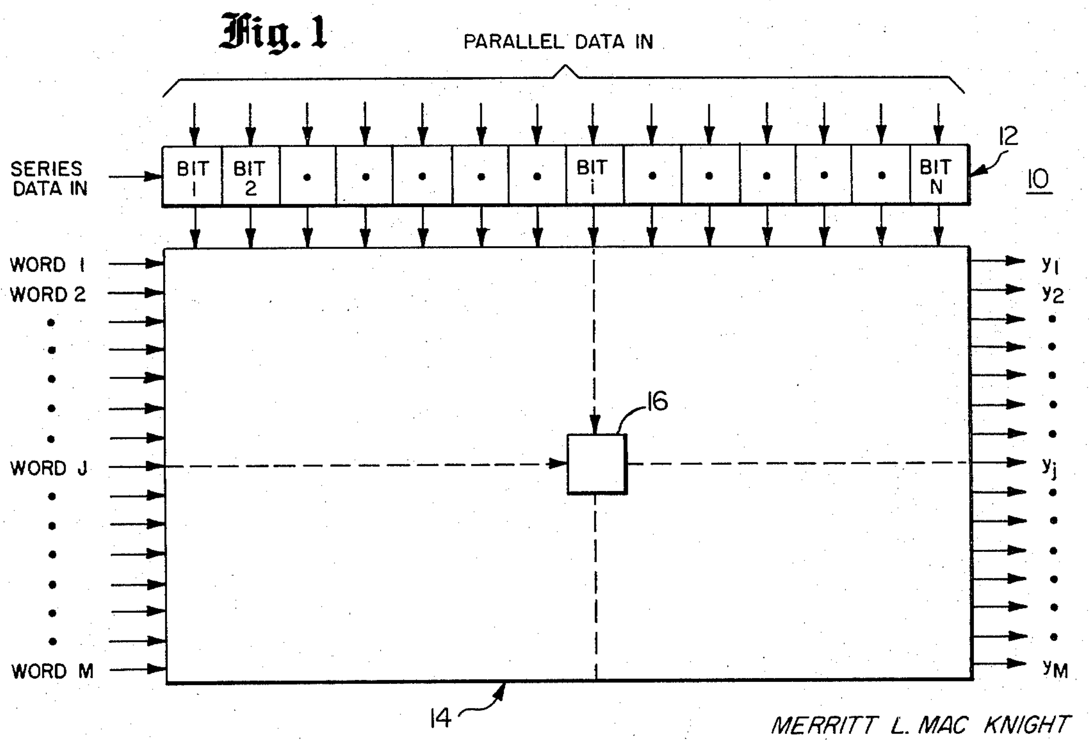
FIG. 1 shows an associative memory system incorporating the present invention.

In the memory of FIG. 1, the applied binary signal is first placed in an input data register 12. In the preferred embodiment of the invention, input data register 12 is an N stage shift register which can receive the applied binary signal either in series or in parallel. If the signal is applied in series, it is merely shifted down the N stages until the entire signal is loaded into the shift register, and if the signal is received in parallel, all stages of the input data register 12 are set simultaneously to a state indicative of a respective bit in the word corresponding to each stage. The output signals from the input data register 12, which thus represent the state of the binary bits in the applied word, are applied to a storage-comparison unit 14 which comprises an N by M array of memory cells 16, a single one of which is shown and described in FIG. 2 below.

The storage-comparison unit 14 consists of an array of M rows of N columns each of such memory cells 16. Each row of N memory cells represents a single one of the M words against which the applied word is to be compared and each column of memory cells 16 represents the same one of the N bits in the respective words. The memory cell 16 shown in FIG. 1 represents the ith bit in word *j*. Thus, the word *j* is formed from the N memory cell 16 which form the row in storage-comparison unit 14 corresponding to word *j*.

Storage-comparison unit 14 provides a plurality of output signals $y_1, y_2 \ldots y_M$ each of which represents the correlation of the applied binary word to the particular word stored in the storage-comparison unit 14 which corresponds to the particular output signal. For example, if each bit in the applied word has the same state as each respective bit in the word *j* stored in storage-comparison unit 14, the output signal $y_j$ provides an output signal indicative of this correlation or match, such as a logic "one" signal. However, if any of the bits in the word stored in word *j* position in storage-comparison unit 14 is different from the respective bit in the applied binary word from input data register 10, the signal $y_j$ indicates that the two words do not match, such as by providing an output signal which is a logic "zero." Thus, the signals $y_1, y_2 \ldots y_M$ indicate which if any of the words stored in storage-comparison unit 14 are the same as the applied word received through input data register 12.

Figure 2:
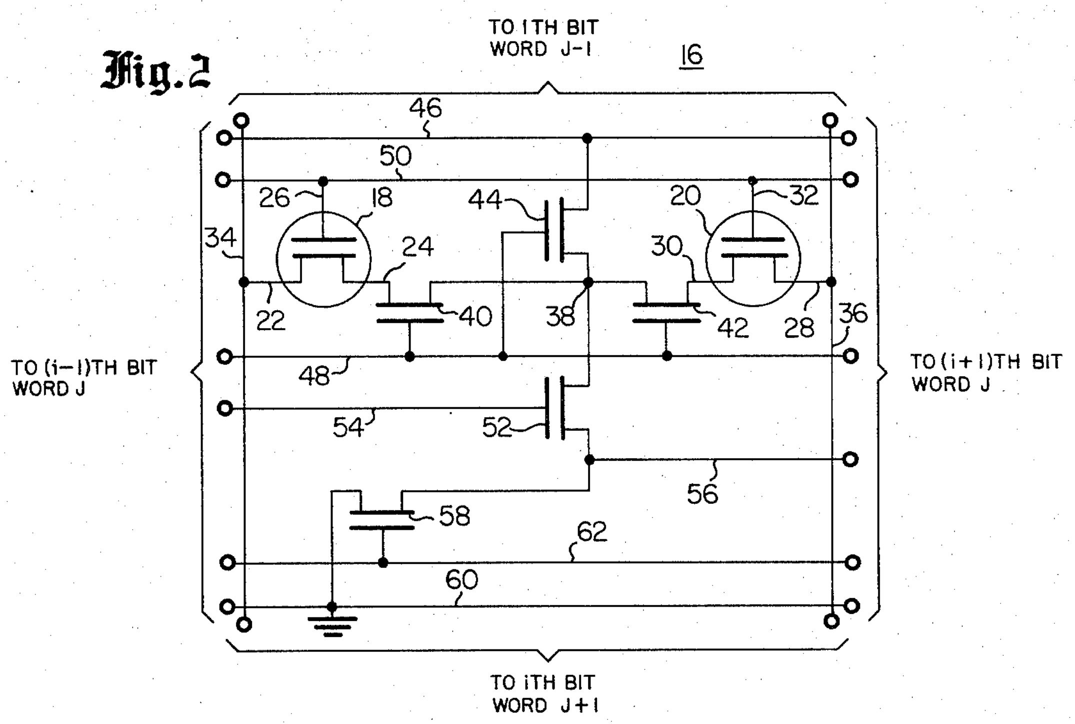
FIG. 2 shows a schematic diagram of a memory cell for use with the memory system of FIG. 1.

FIG. 2 shows a schematic diagram of one of the memory cells 16 of FIG. 1. Memory cell 16 includes a pair of semiconductor memory devices 18 and 20, each of which may be a metal-nitride-silicon semiconductor memory device such as is described in detail in application, Ser. No. 856,575 filed Sept. 10, 1969, and assigned to the assignee of the present application. The physical characteristics of the semiconductor memory devices are described in detail in that co-pending application, so that these details will not be repeated herein. For purposes of describing the present invention, it is sufficient to state that such devices have an electrically controllable conductive threshold voltage, and that by placing suitable control signals on the electrodes of the devices, a given one of the devices can be made to have a threshold conductive voltage of a relatively high or a relatively low value. Thus, when the device is set to have one or the other of these threshold conductive voltages, it may be considered to have been set to represent one of two possible binary states. For example, if the threshold voltage is set to be conductive at a relatively low value, the device may be considered to be set into a binary or logic "one" state and if the threshold voltage is set to be conductive at a relatively high value, the device may be considered to have been set into a binary or logic "zero" state.

The state of the threshold voltage, and thus the binary state at which the device is set, may be read by applying an interrogation signal to the device which is intermediate the two threshold conduction levels. If the device has been set into the "one" state, the application of the intermediate interrogation voltage renders the device conductive, since this interrogation voltage is greater than the threshold voltage corresponding to the "one" state. However, if the device is set to the "-zero" state, it remains non-conductive upon application of the intermediate level interrogation signal, since this signal is less than the threshold conductive level corresponding to the "zero" state.

Returning now to the description of FIG. 2, first semiconductor memory device 18 includes an input electrode 22, an output electrode 24 and a control electrode 26. Similarly, second semiconductor memory device 20 includes an input electrode 28, an output electrode 30 and a control electrode 32. In this described embodiment, the semiconductor memory devices 18 and 20 are insulated gate field-effect transistors which are formed by P channels on an N substrate, so the input electrodes 22 and 28 are the source electrodes, the output electrodes 24 and 30 are the drain electrodes, and the control electrodes 26 and 32 are the gate electrodes of the respective semiconductor memory devices 18 and 20.

Input electrode 22 of first semiconductor memory device 18 is connected to a first bit input line 34, and input electrode 28 of the second semiconductor memory device 20 is connected to a second bit input line 36. The bit input lines 34 and 36 receive complementary signals whose states are dependent upon the output signal of the respective stage in the input data register 12 of FIG. 1 corresponding to the column of bits in which the memory cell 16 is located. For example, if the memory cell 16 is located at the *ith* bit of the *jth* word, such as was shown in FIG. 1, the signals on the bit input lines 34 and 36 represent the state of the ith bit of the applied binary word. If a logic "one" is represented by this bit a voltage level appears on line 34 which represents a logic "one" state and a voltage level appears on the line 36 which represents a logic "-zero" state. Conversely, if the *ith* bit of the applied word is in the "zero" state, a voltage appears on line 34 which represents the logic "zero" state and a voltage appears on line 36 which represents the logic "one" state.

If the input data register 12 of FIG. 1 is formed from a plurality of flip-flop circuits connected as a shift register, both of these complementary logic signals are already present at the stage representing the *ith* bit in input data register 12, so no additional circuitry need be supplied to provide these complementary signals on the bit input lines 34 and 36. However, if input data register 12 is of such a form that it inherently provides only one output signal indicative of the state of the binary bit, this signal may be applied to bit input lines 34 and a simple inverting amplifier (not shown) can be connected between lines 34 and 36 to provide a complementary signal on bit input line 36.

At this point, it is appropriate to define the conventions in the circuit which represent the logic "one" state and the logic "zero" state. Since, as was stated above the devices as used in this particular circuit are N type semiconductors, the circuit is powered by negative voltages with respect to ground. In a typical embodiment, the power supply might be a negative 15 volts. Thus, the logic "one" state may arbitrarily be defined as a negative 15 volts, and the logic "zero" state may arbitrarily be defined as zero volts or ground. It will be recalled from the above description that the logic states of the semiconductor memory devices 18 and 20 have already been defined as representing a logic "one" when these devices are triggered into conduction by the application of an intermediate interrogation signal, and a logic "zero" when this intermediate interrogation signal does not trigger the devices into conduction. Of course, it is appreciated that both of the above definitions are completely arbitrary, and that the logic "one" state and the logic "zero" state could equally well have been defined as representing the opposite voltage levels or the opposite state of conduction. However, for purposes of explanation, it is desirable to maintain consistent definitions throughout the discussion, and the definitions given above are the ones that are used in this discussion.

The output electrodes 24 and 30 of semiconductor memory devices 18 and 20 respectively are connected to an output node 38 through semiconductor switches 40 and 42 respectively. Semiconductor switches 40 and 42 may be, for example, conventional metal-oxide-silicon insulated gate field-effect transistors which can be placed in a saturated condition, thus presenting practically no impedance, upon application of a suitable signal to their gate electrodes. Another transistor 44 interconnects output node 38 with a power source line 46. Transistor 44 forms the load resistance for the memory cell, and may conveniently be another M-O-S insulated gate field-effect transistor but which has characteristics such that when a suitable input signal is applied to its gate electrode, the device is rendered conductive but still has a substantially higher impedance than either the semiconductor switches 40 or 42 or the semiconductor memory devices 18 or 20 exhibits when these devices are rendered conductive by the application of appropriate gating signals. Transistor 44 could easily be replaced by any suitable load across which the output signal could be measured, but in the preferred embodiment of the invention, as was stated above, a resistive M-O-S insulated gate field-effect transistor is preferred, since this can easily be formed as part of the same integrated circuit forming the entire memory cell 16.

This portion of memory cell 16 is completed by connecting the gate electrodes of the devices 40, 42 and 44 to a read line 48 and by connecting the control electrodes 26 and 32 of the semiconductor memory devices 18 and 20 respectively to an interrogate line 50.

The operation of the memory cell 16 as thus far described is now explained. First, consider the manner in which a bit may be written into semiconductor memory devices 18 and 20 for subsequent comparison to an applied signal on bit input lines 34 and 36. First, any existing information stored in the devices 18 and 20 is erased and both of these devices are placed in their "one" state by the application of a high positive voltage (13 volts, for example) to interrogate line 50. This action erases the signals previously stored in the devices 18 and 20 and leaves both of them with relatively low threshold conductive voltages such that the application of an intermediate interrogation signal (such as, for example, negative 5 volts) to interrogate line 50 renders both devices 18 and 20 conductive. During this erase portion of the cycle, no signal is applied to read line 48 so that semiconductor switches 40 and 42 remain non-conductive.

Next, the new bit to be written into memory cell 16 is applied to memory cell 16 through bit input lines 34 and 36. If it is desired to write a binary "one" into this stage, a high negative voltage (a logic "one" by the above definitions) is applied to bit input line 34 and a zero voltage (a logic "zero") is applied to bit input line 36. Simultaneously, a high negative write voltage is applied to the control electrodes of devices 18 and 20 over interrogate line 50. This simultaneous application of voltages has no effect upon memory device 18, since the high voltage is applied to both the control and the input electrode (the gate electrode and the drain electrode in this case) and, as is described in detail in the above mentioned co-pending application, the threshold voltage is not changed and the device remains in the above-defined "one" state. However, device 20 is subjected to a high negative voltage on its gate electrode and a zero voltage on its input or drain electrode, and as described in detail in the above mentioned co-pending application, this causes the threshold voltage of device 18 to shift to a higher negative value, and the device 18 thus assumes the above-defined "zero" state.

Conversely, if it were desired to write a "zero" into the memory cell 16, the high negative voltage, or logic "one", is applied to bit input line 36 while a zero voltage is applied to bit input line 34. For the reasons just described, the simultaneous application of the write voltage to interrogate line 50 then causes the first semiconductor memory device 18 to be placed in the above defined "zero" state and has no effect on the second semiconductor device 20, which thus remains in the above defined "one" state.

A masking sequence may be written into a specified word-bit in the memory if it is desired not to form comparisons against that particular bit of a stored word during later comparison cycles. For example, if it is desired not to compare the *ith* bit of the word stored in the *j* row to subsequent applied signals, then during the second step of the above described write cycle, both bit input lines 34 and 36 are held at zero volts. The application of the negative voltage to the gate electrodes of devices 18 and 20 causes both of these devices to be switched into their "zero" state. As will be seen from the description of the comparison cycle below, this results in the particular word cell indicating that the applied bit and the stored bit are the same, regardless of the state of the applied bit.

It is also seen from the above description of the write cycle that the memory system 10 easily adapts itself to either storing any desired word in the various rows of the memory or writing into the memory the applied binary signal itself for subsequent comparison to future applied binary sequences, since in either event the word to be written into the memory is applied through the bit input lines 34 and 36 from input data register 12.

Now consider the operation of the memory cell 16 during the comparison cycle. When an applied binary signal is to be compared to a word stored in the memory, a read signal is applied to read line 48 and an interrogation signal is applied to interrogate line 50. The value of the read signal applied to read line 48 is of appropriate value to render the transistor switches 40 and 42 completely conductive in a saturated mode so as to present essentially no impedance to an electrical signal flowing between the input and output terminals of these switches. Also, as was discussed above, this signal renders the load transistor 44 conductive. At this time, load transistor 44 has a high impedance value relative to the conductive impedances of the switches 40 and 42 and the memory devices 18 and 20, so an output signal can be developed across load transistor 44. Simultaneously with this, an interrogation signal of intermediate value between the two threshold voltage levels of devices 18 and 20 is applied to the control electrodes 26 and 32 of these devices over interrogate line 50. For example, the value of this signal might be a negative 5 volts if the threshold voltage representing the "one" state is negative 4 volts and the threshold voltage representing the "zero" state is negative 20 volts. This intermediate voltage causes whichever one of the memory devices 18 and 20 is in the "one" state to be rendered conductive while it is not sufficient to trigger the device in the "zero" state into conduction.

Now, consider the effect of the application of these signals to the possible combinations of stored bit states and applied bit states. As was defined above, if the stored bit in memory cell 16 is in the "one" state, memory device 18 is in the "one" state and is thus rendered conductive by application of the interrogation signal, while memory device 20 is in the "zero" state and is not rendered conductive by the application of the interrogation signal. Conversely, if the bit stored in memory cell 16 is in the "zero" state, memory device 18 remains non-conductive during application of the interrogation signal while memory device 20, which is in the "one" state, is triggered into conduction by the interrogation signal. Also, if the applied bit is in the "one" state, a high negative voltage is present on bit input line 34 and a zero voltage is present on bit input line 36, and if the applied bit is in the "zero" state, a zero voltage is present on bit input line 34 and a high negative voltage is present on bit input line 36. Thus, if the stored bit and the applied bit are in the same state, regardless of whether this state is the "one" state or the "zero" state, the semiconductor memory device 18 or 20 which has previously been set into its "one" state and which is rendered conductive by the application of the interrogation signal, has its input electrode 22 or 28 connected to whichever one of the bit input lines 34 and 36 has the high negative voltage thereon. When that memory device and its associated semiconductor switch 40 or 42 is triggered into conduction, this high negative voltage is coupled to the output node 38. As was noted above, load transistor 44 is also triggered into conduction by the application of an appropriate signal to its gate electrode, but no conduction occurs through load transistor 44 at this time, because its input terminal is connected to the power source line 46 while its output terminal is connected to the output node 38, and both of these points are at the same high negative potential. Since no current flows through the load transistor 44, there is no voltage drop thereacross. Thus, output node 38 is held at a high negative voltage, which by the above definitions represents a logic "one", whenever the stored bit and and the applied bit are in the same state.

Conversely, if the stored bit and the applied bit are of opposite state, that semiconductor memory device 18 or 20 which is triggered into conduction by the application of the interrogation signal to interrogate line 50 has its input electrode 22 or 28 connected to whichever one of the bit input lines 34 or 36 that is at zero voltage. This zero voltage is then coupled through the conductive memory device and its associated semiconductor switch 40 or 42 to cause the voltage at output node 38 to become zero. This now causes the load transistor 44 to be conductive, and essentially the entire voltage drop between the power source line 46 and whichever one of the bit input lines 34 and 36 is at zero volts occurs across load transistor 44. Output node 38 thus remains at essentially zero volts, and is at the voltage state representing a logic "zero" by the above definitions.

Thus, it is seen that a logic signal occurs at output node 38 whose sense tells whether or not there was correlation between the bits stored in memory cells 16 and the corresponding bit in the applied binary signal.

The memory cell 16 of FIG. 2 also includes an AND gate 52 which receives as one of its inputs the signal from output node 38 and as its other input a signal on an input correlation line 54. The AND gate 52 may be of any desired structure, but again for convenience it is preferably an M-O-S insulated gate field-effect transistor formed on the same integrated circuit chip as the rest of memory cell 16.

Input correlation line 54 receives as its input signal the output signal from the preceding bit of the same word, or the $(i-1)$th bit of the $j$ word, in this particular case. If all of the previous bits in the $j$ word were the same as the respective bits in the applied word, there will be a signal on input correlation line 54. However, if any of the preceding bits in the $j$ word had been different from the respective bit in the applied word, there would be no signal on input correlation line 54, and thus AND gate 52 would have no output signal.

The output signal of AND gate 52 appears on output correlation line 56, which is then connected to the input correlation line of the next succeeding bit of the same word, or in this case the $(i+1)$th bit of the $j$ word. It is seen that if there is a signal on the input correlation line 54 and if there is a signal at the output node 38 indicating that the stored bit and the applied bit are of the same state, an output signal appears on output correlation line 56 to indicate to the next bit in the word that all of the bits to this point have matched. However, if either there is no signal on input correlation line 54, or if there is no signal, or a "zero" state signal, on output node 38, there is no signal, or a "zero" state output signal, on output correlation line 56, thereby indicating to succeeding bits in the same word that there was at least one bit earlier in the word which did not correlate with its corresponding bit in the applied word. Thus, the final output signal from the Nth bit of the $j$ word, the signal $y_j$ of FIG. 1, is a logic "one" only if there was correlation in the stored and applied bits at every stage along the word, and is a logic "zero" if any stored bit did not correspond to its respective applied bit.

The memory cell 16 of FIG. 2 is completed by the switching transistor 58, which is connected between the output correlation line 56 and a ground line 60. Again, switching transistor 58 is preferably an M-O-S insulated gate field-effect transistor formed on the same chip with the rest of the circuit. Transistor 58 has its gate electrode connected to a clock line 62. A clock signal is applied to the clock line 62 after every comparison cycle. This triggers switch 58 into conduction and assures that the output correlation lines 56, and thus the input correlation lines 54, of every stage are returned to zero volts after each comparison cycle so that no false signals will occur, because of inter-circuit capacitance, from a memory cell whose output node had a "one" signal on the preceding comparison cycle but which now has a "zero" output signal because of a mismatch of the applied bit and the stored bit.

It is noted that in the above description of the memory system of FIGS. 1 and 2, no details are shown as to how the various control and clock signals are generated which are applied along the various word lines such as read line 48, interrogate line 50 and clock line 62. Those skilled in the art are familiar with any number of suitable means for generating and applying such control and timing signals, so no specific arrangement for effecting the desired result is shown in this application.

The invention as thus disclosed, and the presently preferred embodiment thereof is described in detail. However, it is not intended that the invention is limited to this shown embodiment. Instead, many modifications will occur to those skilled in the art which lie within the spirit and scope of the invention. Accordingly, it is intended that the invention be limited only by the appended claims.

What is claimed is:

1. An associative memory cell for comparing an applied binary bit to a binary bit stored in said cell and for providing an output signal indicative of the correlation of said binary bits, comprising, in combination:

first and second semiconductor memory devices each having electrically controllable first and second threshold voltage levels and each having an input electrode, an output electrode and a control electrode;

means for setting the threshold voltage of said semiconductor memory devices to complementary ones of said voltage levels indicative of the state of the binary bit to be stored in said memory cell;

input means for applying complementary signals to the input electrodes of said semiconductor memory devices indicative of the state of the applied binary bit to be compared to said stored binary bit;

means connecting said output electrodes of said semiconductor memory devices to an output node;

means for applying an interrogation signal to said control electrodes of said semiconductor memory devices; and means for obtaining an output signal from said output node indicative of the correlation of said stored bit and said applied bit at the time of application of said interrogation signal.

2. The memory cell of claim 1 in which said semiconductor memory devices each comprises an insulated gate field-effect transistor having a layer of dielectric material which exhibits non-volatile memory characteristics in response to electric fields applied thereacross and said means for setting said threshold voltages comprises means for applying an electric field of predetermined value to said layer of dielectric material.

3. The memory cell of claim 2 in which said layer of dielectric material includes a layer of silicon nitride.

4. The memory cell of claim 3 in which said layer of dielectric material comprises a layer of silicon nitride and a layer of silicon dioxide.

5. The memory cell of claim 1 which further comprises controlled switch means connected between said output electrodes of said semiconductor memory devices and said output node.

6. The memory cell of claim 5 in which said controlled switch means comprises a first semiconductor switch connected between said output electrode of said first semiconductor memory device and said output node and a second semiconductor switch connected between said output electrode of said second semiconductor memory device and said output node.

7. The memory cell of claim 6 which further comprises a resistive load for connecting said output node to a source of electrical power.

8. The memory cell of claim 7 in which said semiconductor memory devices each comprises an insulated gate field-effect transistor having a layer of dielectric material which exhibits non-volatile memory characteristics in response to electric fields applied thereacross and said means for setting said threshold voltages comprises means for applying an electric field of predetermined value to said layer of dielectric material.

9. The memory cell of claim 8 in which said layer of dielectric material includes a layer of silicon nitride.

10. The memory cell of claim 9 in which said layer of dielectric material comprises a layer of silicon nitride and a layer of silicon dioxide.

11. The memory cell of claim 10 in which each of said semiconductor switches comprises a metal-oxide-silicon insulated gate field-effect transistor.

12. An associative memory system for comparing an applied N bit binary signal to M stored binary words of N bits each and for providing output signals indicative of the correlation of said applied signal with said stored words, comprising, in combination:

an M by N array of memory cells in which each row of N memory cells represents one word of N bit length and each column of M memory cells represents the same bit in each of the M words;

each of said memory cells comprising: first and second semiconductor memory devices each having electrically controllable first and second threshold voltages and each having an input electrode, an output electrode and a control electrode; an output node and means connecting said output electrodes to said output node;

means interconnecting the input electrodes of said first semiconductor memory devices in all of said memory cells which are in the same column;

means interconnecting the input electrodes of said second semiconductor memory devices in all of said memory cells which are in the same column;

means interconnecting the control electrodes of said semiconductor memory devices in all of said memory cells which are in the same row;

means for setting the threshold voltage of said first and second semiconductor memory devices in each of said memory cells to complementary ones of said voltage levels indicative of the state of the binary bit to be stored in that particular memory cell;

input means for applying complementary signals to the input electrodes of said first and second semiconductor memory devices of each column of memory cells indicative of the state of the respective bit of the applied binary signal to be compared with said stored binary work;

means for applying an interrogation signal to said control electrodes of said semiconductor memory devices in each row of said memory cells; and means for obtaining an output signal from said output nodes in each row of said memory cells indicative of the correlation of the binary word stored in that row and the applied binary signal at the time of application of said interrogation signal.

13. The memory system of claim 12 in which said semiconductor memory devices in said memory cells each comprises an insulated gate field-effect transistor having a layer of dielectric material which exhibits non-volatile memory characteristics in response to electric fields applied thereacross and said means for setting said threshold voltages comprises means for applying an electric field of predetermined value to said layer of dielectric material.

14. The memory system of claim 13 in which said layer of dielectric material includes a layer of silicon nitride.

15. The memory system of claim 14 in which said layer of dielectric material comprises a layer of silicon nitride and a layer of silicon dioxide.

16. The memory system of claim 12 in which each of said memory cells further comprise controlled switch means connected between said output electrodes of said semiconductor memory devices and said output node.

17. The memory system of claim 6 in which said controlled switch means comprises a first semiconductor switch connected between said output electrode of said first semiconductor memory device and said output node and a second semiconductor switch connected between said output electrode of said second semiconductor memory device and said output node.

18. The memory system of claim 17 in which each of said memory cells further comprises a resistive load for connecting said output node to a source of electrical power.

19. The memory system of claim 18 in which said means for obtaining an output signal from said output nodes in each row of said memory cells comprises a series connection of a plurality of AND gates each associated with a respective memory cell in said row and which receives as its first input a signal from said output node in its respective memory cell and as its second input the output signal from the AND gate associated with the preceding memory cell in said row.

20. The memory system of claim 19 in which said means for obtaining an output signal further comprises a plurality of semiconductor switches each associated with a respective one of said AND gates for controllably grounding the output terminals of said AND gates.

21. The memory system of claim 20 in which said semiconductor memory devices in said memory cells each comprises an insulated gate field-effect transistor having a layer of dielectric material which exhibits non-volatile memory characteristics in response to electric fields applied thereacross and said means for setting said threshold voltages comprises means for applying an electric field of predetermined value to said layer of dielectric material.

22. The memory system of claim 21 in which said layer of dielectric material includes a layer of silicon nitride.

23. The memory system of claim 22 in which said layer of dielectric material comprises a layer of silicon nitride and a layer of silicon dioxide.

24. The memory system of claim 23 in which each of said semiconductor switches comprises a metal-oxide-silicon insulated gate field-effect transistor.

* * * * *